United States Patent [19]
Cacciavillano et al.

[11] Patent Number: 6,124,953
[45] Date of Patent: Sep. 26, 2000

[54] WALLPAPER CONSTRUCTION HAVING A HOLOGRAPHIC BORDER

[76] Inventors: Frank A. Cacciavillano; Lisa M. Cacciavillano, both of 15 N. Bishop Ave., Springfield, Pa. 19064

[21] Appl. No.: 09/135,327

[22] Filed: Aug. 17, 1998

[51] Int. Cl.[7] .......................... G03H 1/00; B42D 15/00; G09F 23/00
[52] U.S. Cl. ..................... 359/1; 359/2; 359/25; 283/86; 283/91; 40/700; 40/743
[58] Field of Search .................. 359/1, 2, 22, 25, 359/26; 283/86, 91; 428/195; 156/83; 430/1; 40/700, 743

[56] References Cited

U.S. PATENT DOCUMENTS

| | | |
|---|---|---|
| 4,838,965 | 6/1989 | Bussard ..................... 156/83 |
| 5,056,880 | 10/1991 | Barbanell ................. 359/25 |
| 5,142,384 | 8/1992 | Wood et al. ............... 359/3 |
| 5,223,357 | 6/1993 | Lovison ..................... 430/1 |
| 5,276,537 | 1/1994 | Savant et al. ............. 359/3 |
| 5,734,485 | 3/1998 | Buchkremer et al. .... 359/25 |
| 5,838,466 | 11/1998 | Mallik ....................... 359/2 |

Primary Examiner—Cassandra Spyrou
Assistant Examiner—Audrey Chang
Attorney, Agent, or Firm—Henderson & Sturm LLP

[57] ABSTRACT

A decorative construction 10 for attachment to a vertical surface wherein the decorative construction 10 includes a main image unit 11 comprising a generally elongated rectangular sheet of decorative paper 20 and a plurality of holographic image units 12 adapted to be operatively associated with the front face 23 of the sheet of decorative paper 20.

14 Claims, 2 Drawing Sheets

WALLPAPER CONSTRUCTION HAVING A HOLOGRAPHIC BORDER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of wallpaper constructions in general, and in particular to a sheet of wallpaper having a recessed portion designed to accept a holographic border.

2. Description of Related Art

As can be seen by reference to the following U.S. Pat. Nos. 4,838,965; 5,142,384; 5,223,357; and 5,276,537 the prior art is replete with myriad and diverse holographic image constructions.

While all of the aforementioned prior art constructions are more than adequate for the basic purpose and function for which they have been specifically designed, they are uniformly deficient with respect to their failure to provide a simple, efficient, and practical way to incorporate a holographic image into the border of a decorative sheet of paper such as wallpaper, a poster, or the like.

As most parents of teenagers and marketers of goods targeting teenagers are well aware, holographic images have become very popular with this particular demographic group.

As a consequence of the foregoing situation, there has existed a longstanding need for a new and improved way to incorporate changeable holographic images into articles that will prominently be displayed on the walls of a teenager's room, and the provision of such a construction is a stated objective of the present invention.

BRIEF SUMMARY OF THE INVENTION

Briefly stated, the wall paper construction that forms the basis of the present invention comprises in general, a main image unit and a plurality of holographic image units which are operatively associated with the main image unit to form a visually attractive border adjacent at least one edge of the main image unit.

As will be explained in greater detail further on in the specification, the main image unit comprises a generally elongated rectangular sheet of decorative paper such as a sheet or panel of wallpaper, a wall poster or the like.

In addition, the plurality of holographic image units each comprise individual holographic image members arranged in a sequential movie frame fashion to depict sequential motions over a period of time wherein as a viewer passes by the sequential holographic image members, a moving visual display will be presented to their optical sensors.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
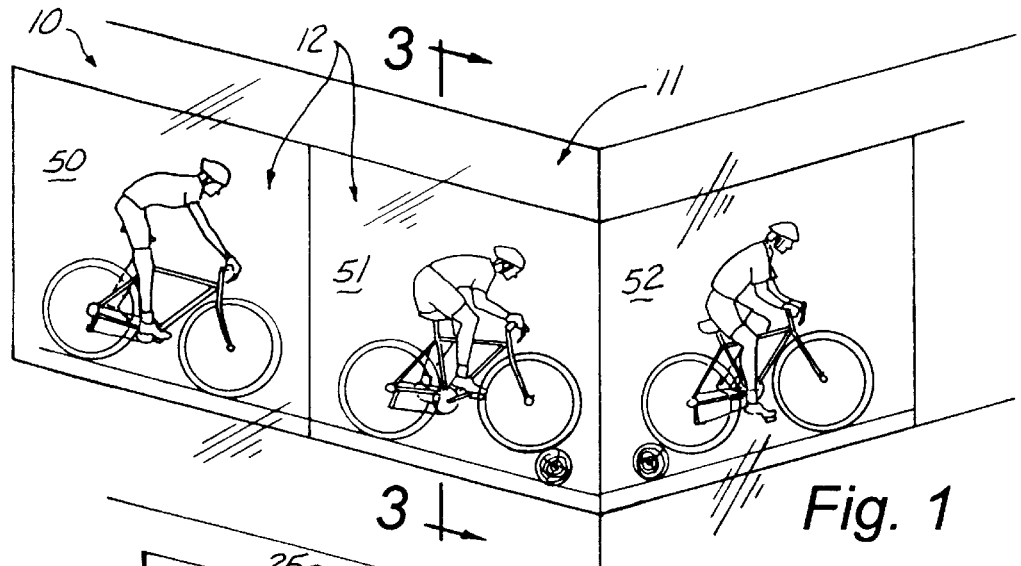
FIG. 1 is a perspective view of the wallpaper construction of this invention disposed on a wall.

As can be seen by reference to the drawings, and in particularly to FIG. 1, the wallpaper construction that forms the basis of the present invention is designated generally by the reference number 10. The construction 10 comprises in general, a main image unit 11, and a plurality of holographic image units 12. These units will now be described in seriatim fashion.

Figure 2:
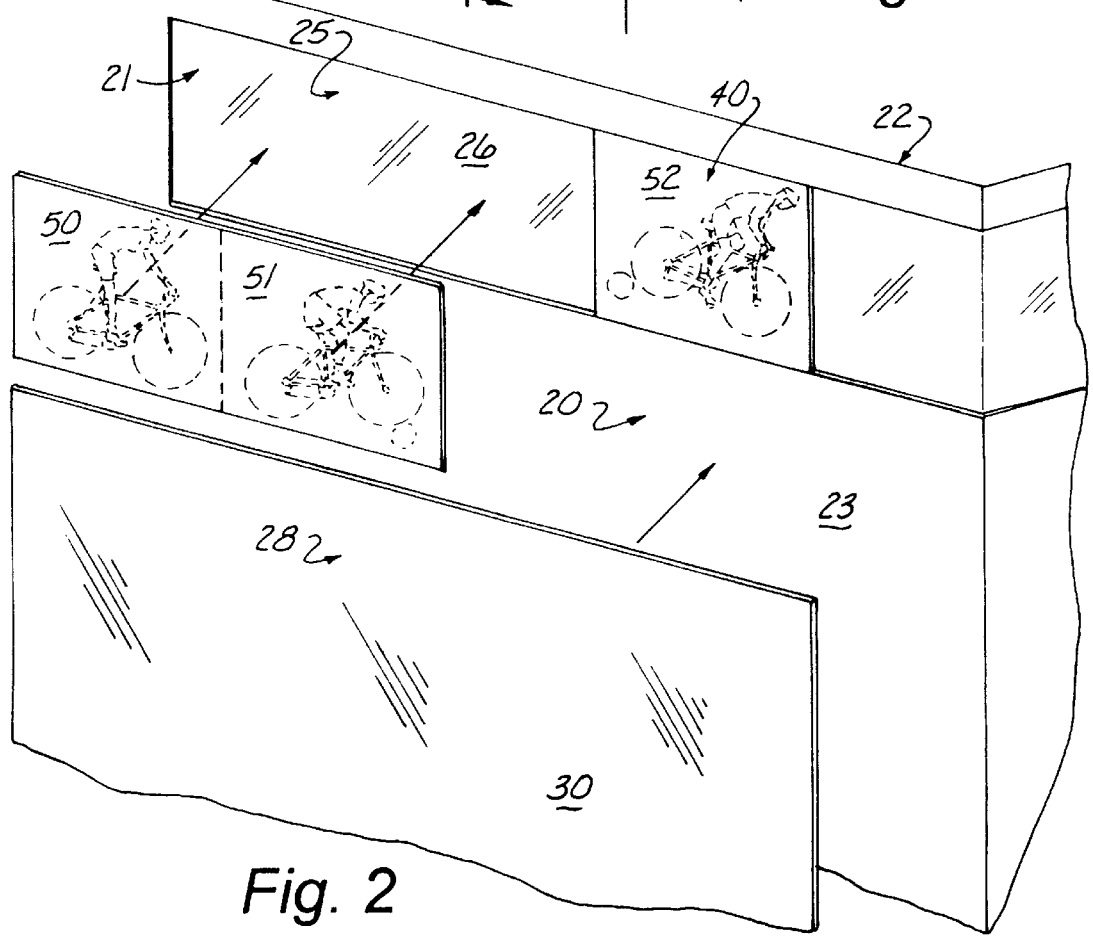
FIG. 2 is an exploded perspective view of the wallpaper construction.
Figure 3:
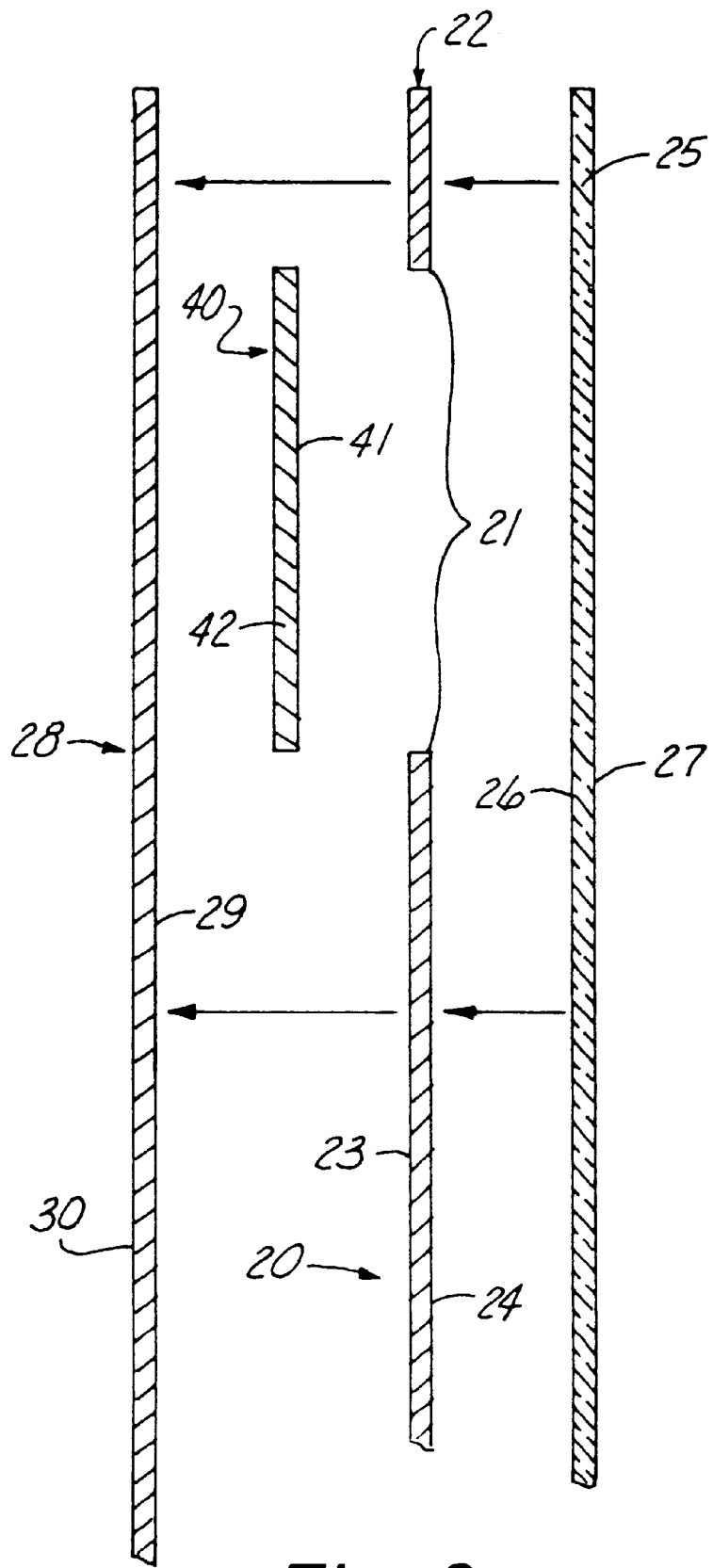
FIG. 3 is an exploded cross sectional view of the construction taken through line 3—3 of FIG. 1.

As can best be seen by reference to FIGS. 2 and 3, the main image unit 11 comprises a generally elongated rectangular sheet of decorative paper 20 such as wallpaper, a wall poster, or the like having an elongated opening 21 formed proximate its upper edge 22 and having a front face 23 and a rear face 24.

In addition, the main image unit 11 further comprises a backing sheet 25 having a front face 26 adapted to be fixedly secured to the rear face 24 of the sheet of decorative paper 20 and having a rear face 27 adapted to be adhesively secured to a vertical wall surface (not shown) by wallpaper paste, contact adhesive, or the like.

Furthermore, the main image unit 11 also comprises a transparent cover sheet 28 having a rear face 29 adapted to be releasably secured to the front face 23 of the sheet of decorative paper 20 and a front face 30 that is washable.

At this juncture, it should be noted that while in the preferred embodiment of the invention illustrated in the drawings, the cover sheet 28 has the same peripheral dimensions as the sheet of decorative paper 20 it is also contemplated by the invention that the cover sheet 28 will only extend a given distance beyond the confines of the elongated opening 21 for reasons that will be explained presently.

As shown in FIGS. 1 through 3, each of the plurality of holographic image units 12 comprise a holographic image member 40 which is dimensioned to be received in a sequential fashion within the elongated opening 21 in the sheet of decorative paper 20. The rear face 41 of the holographic image member 40 is adapted to be releasably engaged with the front face 26 of the backing sheet 25. The front face 42 of the holographic image member 40 is adapted to be releasably engaged by the rear face 29 of the cover sheet 28.

As can clearly be seen by reference to FIGS. 1 and 2, each of the images designated generally as 50, 51 and 52 are representative of individual movie frame style image wherein as a person passes by the sequential holographic image members 40, they will receive the visual impression of a motion picture sequence which will substantially enhance the visual aesthetic impact of the construction 10.

It should also be noted that the removable nature of the cover sheet 28 relative to the holographic image members 40 and the releasable engagement of the image members 40 relative to the backing sheet 25 allows the holographic image members 40 to be varied at the user's discretion.

It should further be noted that this construction 10 also envisions the plurality of holographic image units 12 being directly associated with the front face 23 of the sheet of decorative paper 20 particularly in those instances wherein the sheet of decorative paper 20 constitutes a wall poster and the plurality of holographic image units 12 are employed as a decorative border along one or more of the edges of the poster.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A decorative wallpaper and poster construction for attachment to a vertical wall surface wherein the construction comprises:
   a main image unit including a generally elongated rectangular sheet of decorative paper having a front face, a rear face, and a relatively narrow elongated opening formed proximate at least one edge of the sheet of decorative paper;
   a backing sheet having a front face secured to the rear face of the decorative sheet of paper at least in the area surrounding the elongated opening and a rear face adapted to be secured to said vertical wall surface; and
   a plurality of holographic image units dimensioned to be received in said elongated opening wherein each holographic image unit comprises a holographic image member having a front face and a rear face adapted to be operatively connected to the front face of said backing sheet.

2. The construction as in claim 1 wherein the front face of each holographic image member has a different holographic image created thereon.

3. The construction as in claim 2 wherein the different holographic images share a common subject matter.

4. The construction as in claim 3 wherein the common subject matter involves movement over a period of time.

5. The construction as in claim 4 wherein the different holographic images are arranged in sequential fashion to depict a series of related sequential movements over a period of time in movie frame fashion.

6. The construction as in claim 5 further including:
   a transparent cover sheet having a front face and a rear face and dimensioned to be secured to at least the front faces of the holographic image members.

7. The construction as in claim 6 wherein said transparent cover sheet is dimensioned to be secured to the front face of the sheet of decorative paper at least in the are surrounding the elongated opening.

8. A decorative wallpaper and poster construction for attachment to a vertical wall surface wherein the construction consisting of:
   a main image unit including a generally elongated rectangular sheet of decorative paper having a front face, a rear face, and a relatively narrow elongated opening formed proximate at least one edge of the sheet of decorative paper;
   a backing sheet having a front face secured to the rear face of the decorative sheet of paper at least in the area surrounding the elongated opening and a rear face adapted to be secured to said vertical wall surface; and
   a plurality of holographic image units dimensioned to be received in said elongated opening wherein each holographic image unit comprises a holographic image member having a front face and a rear face adapted to be operatively connected to the front face of said backing sheet.

9. The construction as in claim 8 wherein the front face of each holographic image member has a different holographic image created thereon.

10. The construction as in claim 9 wherein the different holographic images share a common subject matter.

11. The construction as in claim 10 wherein the common subject matter involves movement over a period of time.

12. The construction as in claim 11 wherein the different holographic images are arranged in sequential fashion to depict a series of related sequential movements over a period of time in movie frame fashion.

13. The construction as in claim 12 further including:
   a transparent cover sheet having a front face and a rear face and dimensioned to be secured to at least the front faces of the holographic image members.

14. The construction as in claim 13 wherein said transparent cover sheet is dimensioned to be secured to the front face of the sheet of decorative paper at least in the are surrounding the elongated opening.

* * * * *